(12) United States Patent
Enmeiji et al.

(10) Patent No.: US 6,675,927 B1
(45) Date of Patent: Jan. 13, 2004

(54) FORK LIFT WITH LATERALLY TRAVELLING SYSTEM

(75) Inventors: Yoshiyuki Enmeiji, Osaka (JP); Takeshi Nishikawa, Osaka (JP); Yoshiyuki Kouyama, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 09/980,555

(22) PCT Filed: Apr. 24, 2000

(86) PCT No.: PCT/JP00/02693
§ 371 (c)(1),
(2), (4) Date: Oct. 23, 2001

(87) PCT Pub. No.: WO00/64800
PCT Pub. Date: Nov. 2, 2000

(30) Foreign Application Priority Data

| Jul. 8, 1999 | (JP) | 11/193811 |
| Feb. 10, 2000 | (JP) | 2000-32538 |
| Apr. 26, 2000 | (JP) | 11/117372 |
| Apr. 26, 2000 | (JP) | 11/117373 |
| Apr. 26, 2000 | (JP) | 11/117375 |

(51) Int. Cl.$^7$ ................................................. B62D 7/14
(52) U.S. Cl. ....................................................... 180/411
(58) Field of Search ................................. 180/408, 409, 180/411, 414, 415

(56) References Cited

U.S. PATENT DOCUMENTS

| 3,087,564 A | * | 4/1963 | Quayle .......................... 180/411 |
| 3,490,555 A | * | 1/1970 | Noack .......................... 180/411 |
| 4,823,899 A | | 4/1989 | Ron |
| 5,325,935 A | | 7/1994 | Hirooka et al. |
| 5,482,125 A | * | 1/1996 | Pagett .......................... 180/6.32 |
| 5,699,873 A | * | 12/1997 | Moriya et al. .............. 180/402 |
| 6,125,963 A | * | 10/2000 | Staiger .......................... 180/411 |

FOREIGN PATENT DOCUMENTS

| JP | 1-168580 | 7/1989 |
| JP | 2-306879 | 12/1990 |
| JP | 3-235762 | 10/1991 |

* cited by examiner

Primary Examiner—Kevin Hurley
(74) Attorney, Agent, or Firm—Fildes & Outland, P.C.

(57) ABSTRACT

A fork lift with a laterally travelling system, wherein when a running mode is switched from a normal running in which right and left front wheels and rear wheels face in a longitudinal direction to a lateral running, rotating means is operated to rotate a turning member about a vertical axis in order to change the direction of the front wheels relative to that of a vehicle body, a change in running direction can be performed smoothly because the front wheels are formed integrally with a running drive device, and the front wheels are driven in forward and reverse directions by the running drive device after the front wheels are turned to face sideways so that a fork lift can run laterally and the rear wheels can be changed in direction in a follow-up manner by a turning caster system or can be changed in direction forcibly in the same manner as the front wheels, whereby the wheels of a drive system, though the fork lift is of a type capable of performing a normal forking operation, can be steered to face sideways so that it can run laterally to, for example, perform transportation of long materials with ease through a fork.

1 Claim, 20 Drawing Sheets

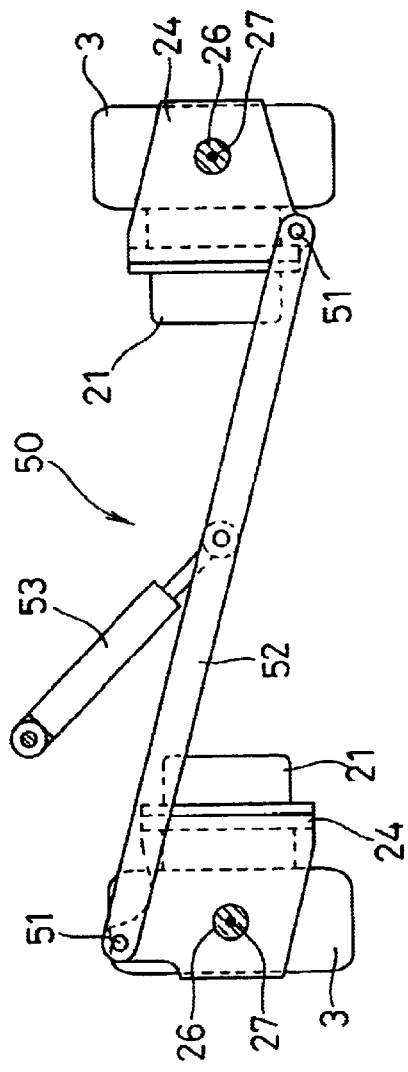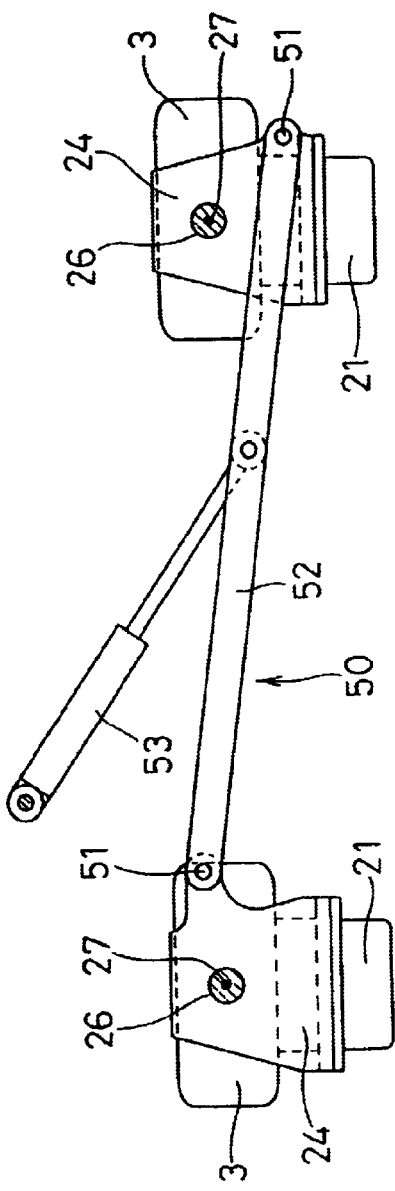
FIG. 11A
FIG. 11B

FORK LIFT WITH LATERALLY TRAVELLING SYSTEM

TECHNICAL FIELD

The present invention relates to a fork lift with a laterally travelling system which can switch the fork lift to lateral running.

BACKGROUND ART

Conventionally, vehicles having a laterally travelling system have been seen among large-scale transporters, some kinds of loaders and the like, and reach-type electric vehicle type fork lift devices. Furthermore, there are also side fork lifts for handling long materials, which have a mast or forks installed in a lateral direction with respect to the movement of the vehicle. However, there is no counter-type fork lift which has a function similar to that of a side fork capable of lateral moving in addition to ordinary operational functions. In order to achieve a fork lift of such kind, it is necessary to steer front wheels which are drive wheels in a perfectly lateral direction.

More specifically, in a conventional fork lift 1 as illustrated in FIG. 23, a pair of right and left-hand front wheels (drive wheels) 3 are provided to a front portion of a vehicle 2, a pair of right and left-hand rear wheels (steering wheels) 4 are provided to a rear portion thereof, and a driver's room 5 is provided above the front portion of the vehicle 2. A vertically extendable mast 6 is provided in the front end section of the vehicle 2 to be rotatable in the front-and-rear direction by means of a coupling axle 7 extending in the lateral direction of the vehicle, and a tilt cylinder 8 for performing front-and-rear rotation is provided between the vehicle 2 and the mast 6.

The mast 6 comprises a pair of right and left-hand outer frames 9 on the fork lift 1, and a pair of right and left-hand inner frames 10 guided on the outer frames 9 to be able to move vertically, a lift cylinder 11 provided between the outer frames 9 and inner frames 10. Furthermore, a lift bracket 12 guided by the inner frames 10 to be able to move vertically is provided, and a pair of right and left-hand forks 13 are provided to this lift bracket 12 via a pair of upper and lower finger bars.

A seat 15, and a handle 16 or the like disposed to the front of this seat 15 are provided in the driver's room 5, and above these elements, a head guard 19 is provided via front pipes 17 and rear pipes 18 projecting from the vehicle body 2. A counter weight 20 is provided on the vehicle body 2, to the rear of the seat 15.

However, in the conventional fork lift 1 described above, since the right and left-hand front wheels 3 are driven by a common travel drive, it is not possible to steer these front wheels 3 in a perfectly lateral direction, and hence lateral running cannot be achieved.

DISCLOSURE OF THE INVENTION

Therefore, it is a first object of the present invention to provide a fork lift with a laterally travelling system so that the front wheels forming the drive wheels can be steered to face directly sideways, whilst being capable of performing ordinary fork operations.

It is a second object of the present invention to provide a fork lift with a laterally travelling system which allows adjustment of linear movement and change of the direction of the vehicle body during lateral running.

It is a third object of the present invention to provide a fork lift with a laterally travelling system which permits the vehicle to readily turn during lateral running.

It is a fourth object of the present invention to provide a fork lift with a laterally travelling system which allows the front wheels to steer, with the mast being disposed between the right and left-hand front wheels.

In order to achieve the first object described above, the fork lift with a laterally travelling system according to the present invention is characterized in that a pair of right and left-hand front wheels and a pair of right and left-hand rear wheels are provided in a steerable fashion on a vehicle body, the pair of right and left-hand front wheels are coupled respectively to driving shafts of travel drive devices, both travel drive devices are installed on turning members provided rotatably about a vertical axis with respect to the vehicle body, rotating means for performing rotation of the turning members is provided, a mast is provided on the front end of the vehicle body, and forks are provided on the mast.

According to the present invention described above, during normal running, the right and left-hand front and rear wheels face in the front-and-rear direction. Thereupon, by operating a lift lever, the forks are raised or lowered along the mast, and prescribed fork operations can be performed. When switching from normal running to lateral running, rotating means is actuated first and the turning members are rotated about the vertical axis, whereby the front wheels can be steered (to be in a perfectly lateral direction) with respect to the vehicle body. Here, since the front wheels are respectively formed integrally with running drive devices, it is possible to perform this turning operation readily and smoothly. After steering the front wheels in a perfectly lateral direction in this manner, the fork lift can be caused to run laterally in the right and left direction, by driving the front wheels in the forward and reverse directions by means of the travel drive devices. In so doing, follow-up steering of the rear wheels is effected by means of a turning caster system, or alternatively, the rear wheels are steered forcibly in a similar manner to the front wheels.

In this way, in the present invention, it is possible to perform lateral running by steering the driving front wheels so as to face in a perfectly lateral direction, while using normal fork operations. Hence it is possible to readily convey long materials, for example, by means of the forks.

In order to achieve the second object described above, in the first aspect of the fork lift with a laterally travelling system according to the present invention, the rotating means is constituted such that the two turning members are operated to turn in mutually opposing directions by means of a common actuation device.

According to this first aspect of the invention, when switching from normal running to lateral running, it is possible to steer the front wheels (to a perfectly lateral direction) with respect to the vehicle body by actuating the common actuation device of the rotating means so as to rotate the turning members in mutually opposing direction about the vertical axes. In this manner, after steering the front wheels to a perfectly lateral direction, the fork lift can be made to run laterally in the right and left direction, by controlling and rotating the front wheels in mutually opposing directions by means of the travel drive devices.

Moreover, when performing lateral running, in other words, in lateral running mode wherein the two front wheels are steered laterally with respect to the vehicle body, it is possible to readily correct deviation caused in the linear movement of the vehicle by road surface conditions or the weight balance of the vehicle, by slight actuation of the actuation device to steer the two front wheels inwards or outwards by a small angle. Moreover, by steering the front wheels inwards or outwards, the direction of the fork lift can also be changed to some extent during lateral running, and hence steering during lateral running can be performed.

Moreover, in a second aspect a fork lift with a laterally travelling system according to the present invention, the rotating means comprises coupling sections of the turning members disposed in mutually opposing directions in the front-and-rear direction with respect to the vertical axis; a link member in the lateral direction of the vehicle, the link member being coupled between these coupling sections to enable the turning members to be relatively rotatable; and an actuation device for moving this link member in the lateral direction of the vehicle.

According to this second aspect of the invention, it is possible to steer the front wheels readily and reliably with respect to the vehicle body by moving the link member in the lateral direction of the vehicle, by means of the actuation device.

In order to achieve the third object described above, in the third aspect of the fork lift with a laterally travelling system according to the present invention, when the rotating means is operated to rotate the turning members, the two drive wheels laterally directed are displaced in the front-and-rear direction.

According to this third aspect of the invention, by controlling and rotating the drive wheels by means of the travel drive devices, after the drive wheels have been steered to be in perfectly lateral directions, in other words, by controlling and rotating the right and left-hand drive wheels in such a manner that the rotational directions and the speeds of revolutions thereof are the same, the fork lift can be made to travel laterally in a right and left direction. Moreover, since the two drive wheels steered directed to be perfectly lateral are displaced in the front-and-rear direction of the vehicle, when performing lateral running, a turning force to the right or left can act on the vehicle, by simply differentiating the speeds of revolutions of the right and left-hand drive wheels by operating a handle or the like. Hence, lateral running can be performed while steering the vehicle readily in the longitudinal direction (front-and-rear direction) thereof, and any deviation caused in linear movement of the vehicle by the road surface conditions or the weight balance can be readily corrected.

In order to achieve the fourth object described above, in a fourth aspect of a fork lift with a laterally travelling system according to the present invention, the mast is installed between the right and left-hand front wheels at the front end of the vehicle to be rotatable in the front-and-rear direction by means of a coupling axle disposed in the lateral direction of the vehicle above the front wheels, a rotational drive device for effecting front-and-rear rotation is provided between the vehicle body and the mast, and when the mast is rotated by this rotational drive device, the lower section of the mast is moved to a position where the mast does not interfere with the steering of the front wheels.

According to this fourth aspect of the present invention, during normal running, the mast assumes an upright attitude, the lower section thereof being disposed between the right and left-hand front wheels, and hence the fork lift can be formed without creating a long front overhang. The operation of switching from normal running to lateral running can be performed by rotating (inclining) the mast about the coupling axle by operating the rotating drive device and moving the lower section thereof to a position where the mast does not interfere with the steering of the front wheels, steering the front wheels to a 90° position (to be directed laterally) with respect to the vehicle body, and rotating the mast about the coupling axle by reverse operation of the rotating drive device to return the mast to the upright attitude. Thereby, the fork lift can be made to travel laterally, while performing smooth turning without any hindrance and without creating a long front overhang.

BRIEF DESCRIPTION OF THE DRAWINGS

FIG. 11 is a plan view of a lateral running operating section of the fork lift with a laterally travelling system;

BEST MODE FOR CARRYING OUT THE INVENTION

A first embodiment of the present invention is described below with reference to FIG. 1 to FIG. 4.

Figure 23:
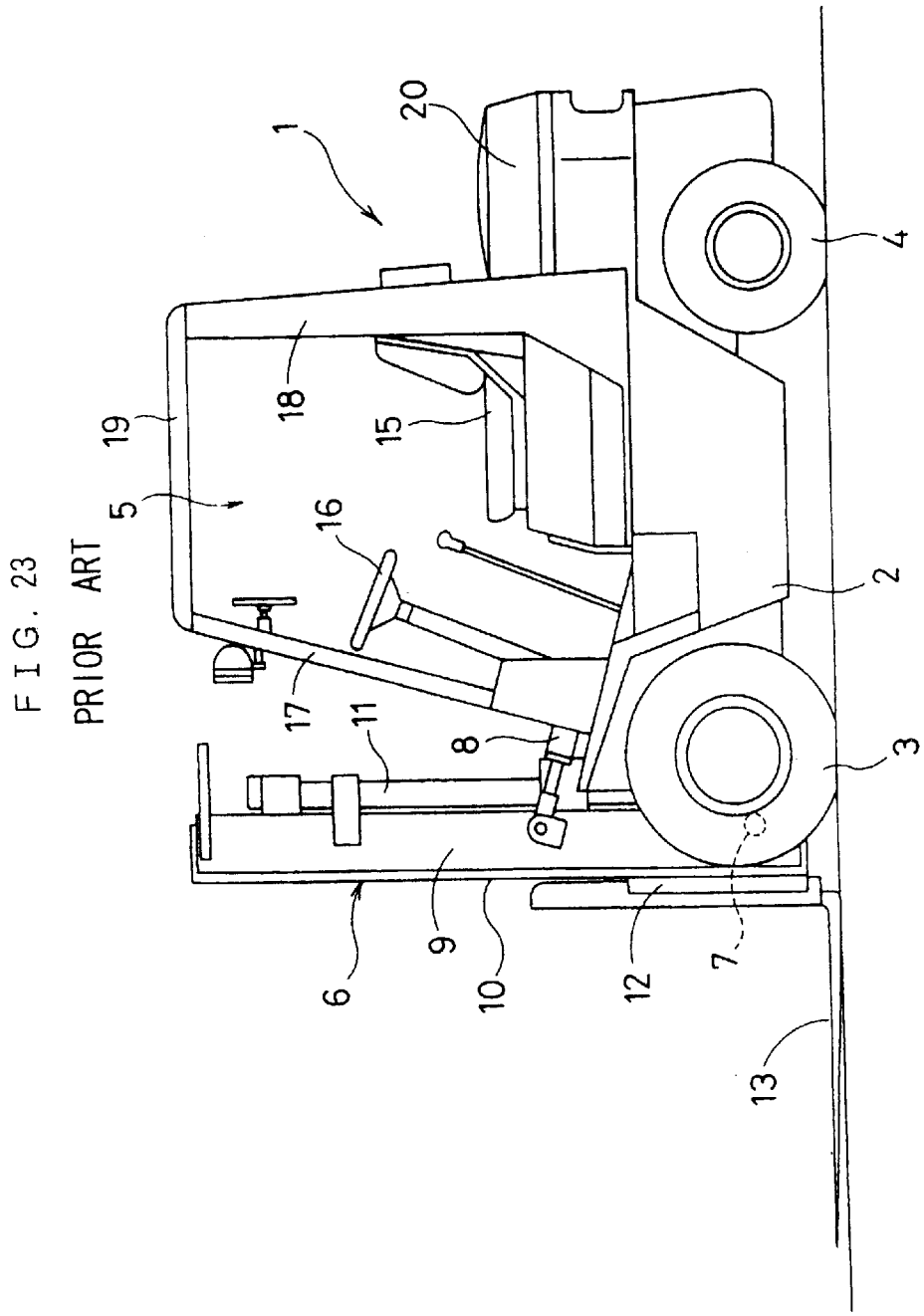
FIG. 23 is a side view of a fork lift, illustrating an example of a prior art.

In the first embodiment, constituent elements which are the same or substantially the same as those in the prior art example (FIG. 23) described above are similarly labelled, and further explanation thereof is omitted here. Specifically, 1 is a fork lift, 2 is a vehicle body, 3 are front wheels (drive wheels), 4 are rear wheels (steering wheels), 5 is a driver's room, 6 is a mast, 7 is a coupling axle, 8 is a tilt cylinder, 9 is an outer frame, 10 is an inner frame, 11 is a lift cylinder, 12 is a lift bracket, 13 is a fork, 15 is a seat, 16 is a handle, 17 is a front pipe, 18 is a rear pipe, 19 is a head guard, and 20 is a counterweight.

The pair of right and left-hand front wheels 3 and the pair of right and left-hand rear wheels 4 are provided such that they are respectively steerable to be angled 90° (steerable in a perfectly lateral direction) with respect to the vehicle body 2. More specifically, the pair of right and left-hand front wheels 3 are coupled to hydraulic motors 21 by means of rims 3A thereof being respectively attached directly to a rotating flange (one example of a driving shaft) 22 of the hydraulic motor (one example of a travel drive) 21, via a coupling tool 23.

A mount of each hydraulic motor 21 is attached in a lateral direction to a vertical plate section of an inverse L-shaped turning member 24. A lateral plate section of the turning member 24 is provided to the vehicle body 2 to be rotatable about a vertical axis 27 via a bearing 25 and a vertical axle 26. In this case, the vertical axis 27 is positioned directly above the front wheel 3. The right and left-hand turning members 24 are coupled by means of a link 28 or the like, and are rotated by means of a common turning cylinder (an example of rotating means) 29, whereby the right and left-hand front wheels 3 are caused to steer in mutually opposing directions in such a manner that they face in a perfectly lateral direction.

An engine 30 and a pair of hydraulic pumps 31 driven by the engine 30 are provided on the vehicle body 2. The corresponding hydraulic pumps 31 and the hydraulic motors 21 are coupled by means of tubes (hydraulic hoses or the like) 32 in such a manner that the hydraulic pumps 31 correspond respectively to one of the hydraulic motors 21, in other words, in such a manner that a two-pump two-motor type hydraulic drive system (HST system) is formed.

Rims 4A of The pair of right and left-hand rear wheels 4 are installed in such a manner that respective rims 4A thereof are rotatable with respect to the vertical plate section of a turning member 34. The lateral plate section of each turning member 34 is provided to the vehicle body 2 to be rotatable about a vertical axis 37 by means of a bearing 35 and a vertical axle 36. In this case, the vertical axis 37 is positioned directly above the rear wheel 4. In other words, the pair of right and left-hand rear wheels 4 are steered in a follow-up steering manner by use of a turning caster system.

Explained below is the operation in the first embodiment described above.

Figure 1:
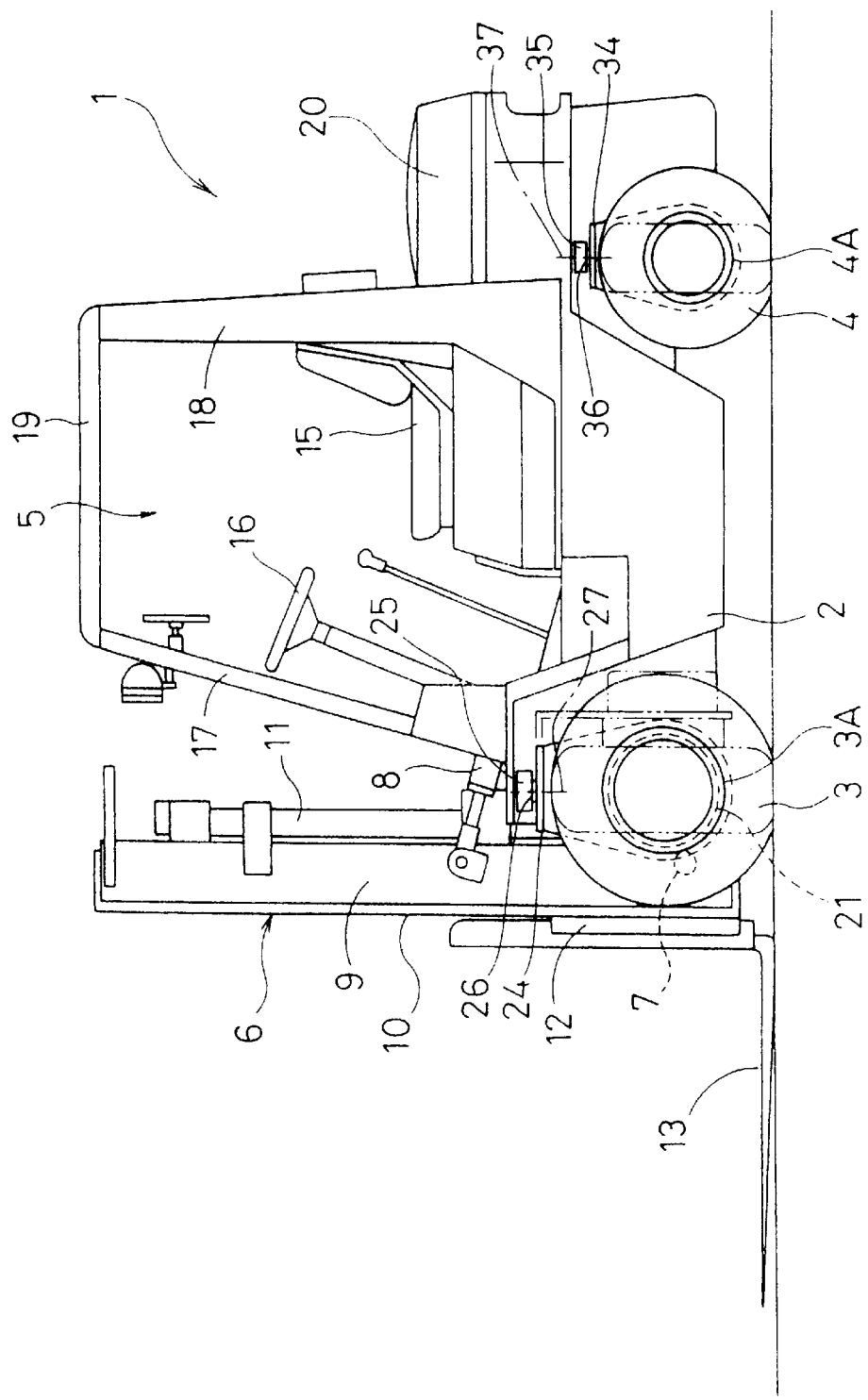
FIG. 1 is a side view of a fork lift with a laterally travelling system during normal running, illustrating a first embodiment of the present invention.
Figure 2:
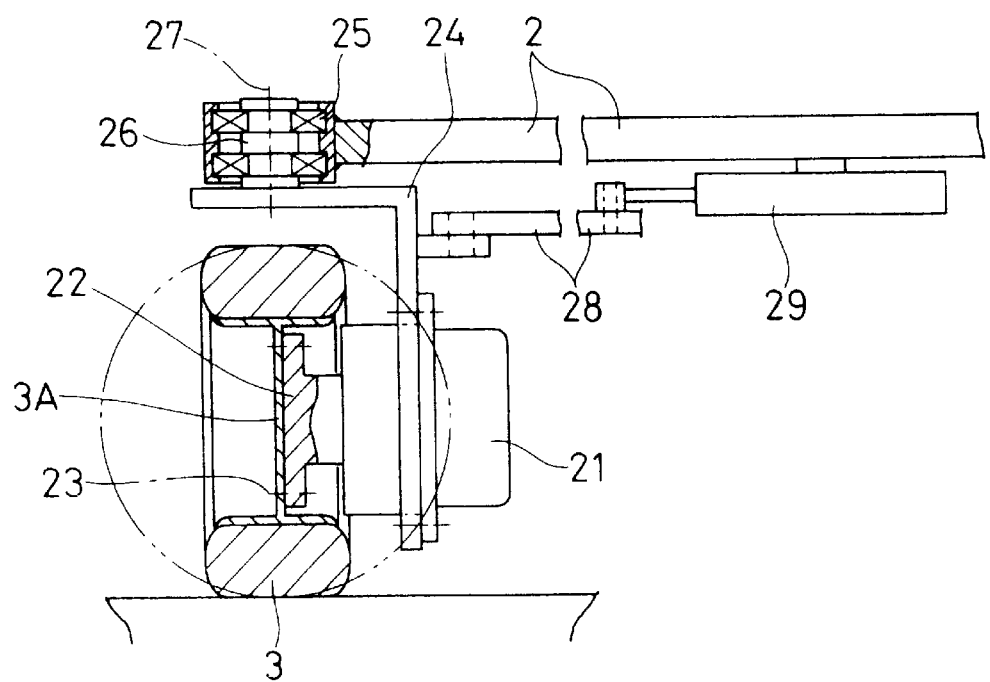
FIG. 2 is a partially cutaway front view of a front wheel section of the fork lift with a laterally travelling system.
Figure 3:
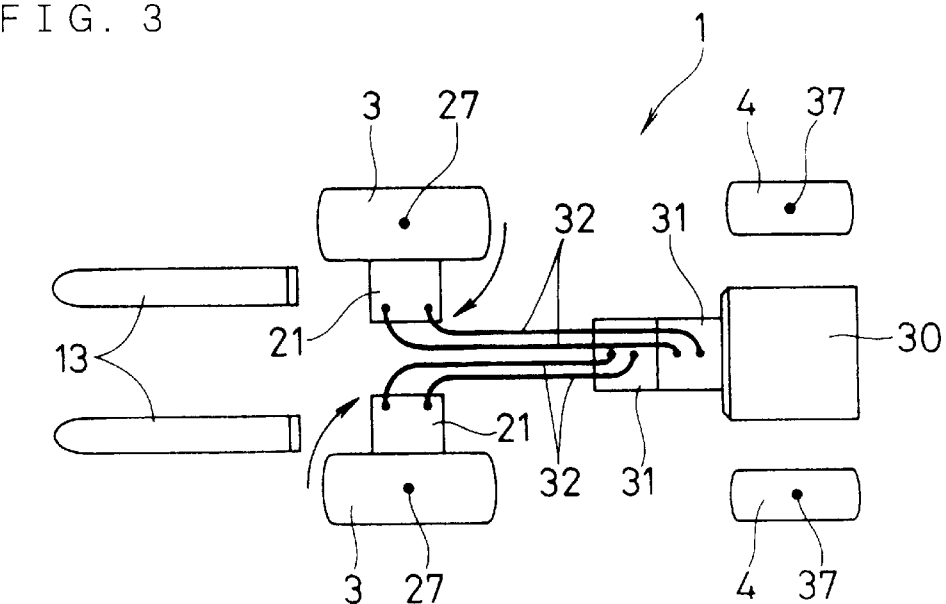
FIG. 3 is a schematic plan view of the fork lift with a laterally travelling system during normal running.
Figure 4:
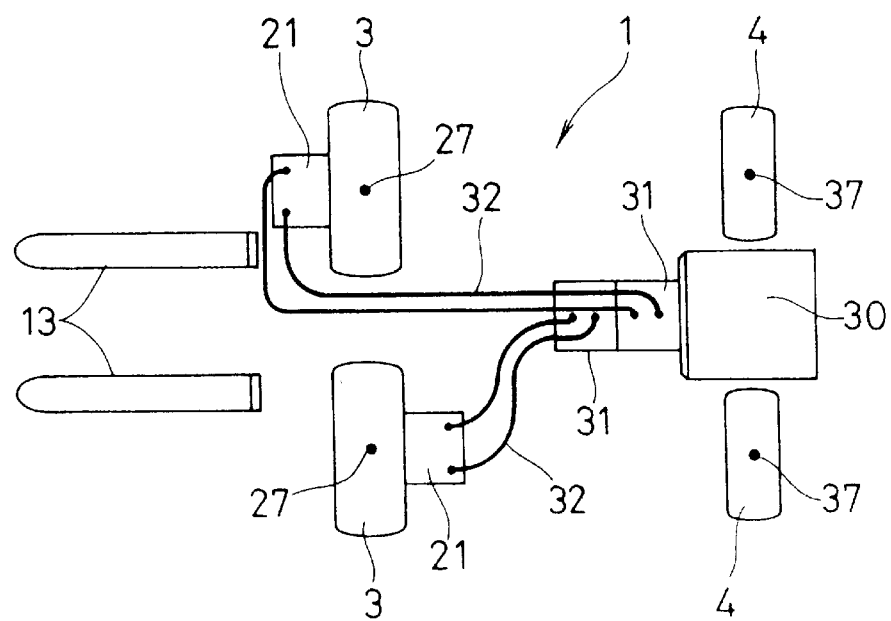
FIG. 4 is a schematic plan view of the fork lift with a laterally travelling system during lateral running.

The solid lines in FIG. 1 and FIG. 2, and FIG. 3 illustrate a state of normal running, where the right and left-hand front wheels 3 and the right and left-hand rear wheels 4 are facing in the front-and-rear direction. A fork lift 1 of this kind can be driven to travel by an operator seated on the seat 15 in the driver's room 5 and operating the handle 16.

By operating a lift lever to actuate the lift cylinder 11, the fork 13 can be raised or lowered along the mast 6 via the lift brackets 12 and the like, and hence required fork operations can be performed. Further, by operating the tilt lever to actuate the tilt cylinder 8, the mast 6 can be rotated (inclined) about the coupling axle 7, and therefore the attitude of the forks 13 can be changed via the lift brackets 12 or the like.

When changing from such a normal running mode to a lateral running mode, a lever-type lateral mode switch (not shown) is operated first, then the turning cylinders 29 are actuated by inclining the lever, and the turning members 24 are rotated about the vertical axis 27 via the link 28. Thereby, as illustrated by the virtual lines in FIG. 1 and FIG. 2 and in FIG. 4, the front wheels 3 are steered 90° (steered to be in a perfectly lateral direction) with respect to the vehicle body 2.

Here, since the front wheels 3 are respectively formed integrally with the hydraulic motors 21, this steering to a 90° position is performed smoothly. Further, since each vertical axes 27 are positioned directly above the front wheels 3, the front wheels 3 or the like can be steered to a 90° position in a compact manner.

Steering of the front wheels 3 in this manner, in other words, the steering of the front wheels 3 to be in a perfectly lateral direction is detected by a sensor which makes an indicator lamp to light up, whereby the lateral running mode can be assumed. Consequently, by supplying hydraulic pressure from the pair of hydraulic pumps 31 driven by the engine 30 to the corresponding hydraulic motors 21 via the pipes 32, according to the forward or reverse control performed in the driver's room 5, the front wheels 3 are driven in the forward or reverse direction, and hence the fork lift 1 can travel laterally in the left or right direction. In so doing, the pair of rear wheels 4 forming a turning caster system perform follow-up steering.

By performing lateral running in this way, it is possible, for example, to readily convey elongate objects by means of the forks 13. Correction of linearity in the lateral running can be readily performed by minute operation of the turning cylinders 29 by inclining the lever in the front-and-rear direction so as to perform minute adjustment of the angle of the front wheels 3.

Moreover, by adopting a two-pump two-motor type hydraulic drive system for the drive of the fork lift 1, the steering during normal running as described above can be performed by controlling the direction of rotations of the front wheels 3 and the difference in number of rotations thereof by means of a handle wheel, but in the lateral running mode, this steering system is stopped electrically.

Next, a second embodiment of the present invention is described with reference to FIG. 5 to FIG. 8.

In this second embodiment, constituent elements which are the same or substantially the same as those in the first embodiment described above (FIG. 1–FIG. 4) are similarly labelled, and detailed explanation thereof is omitted here.

The pair of right and left-hand front wheels 3 are coupled to electric motors 41 by means of the rims 3A thereof respectively attached directly to a rotating flange (driving shaft) 42 of the electric motor (another example of a travel drive) 41 by means of a coupling tool 23. A battery 43 is mounted in the vehicle body 2, and a controller 44 is attached to this battery 43. A cable 45 from the controller 44 is connected respectively to each electric motor 41.

Explained below is the operation in the second embodiment described above.

Figure 5:
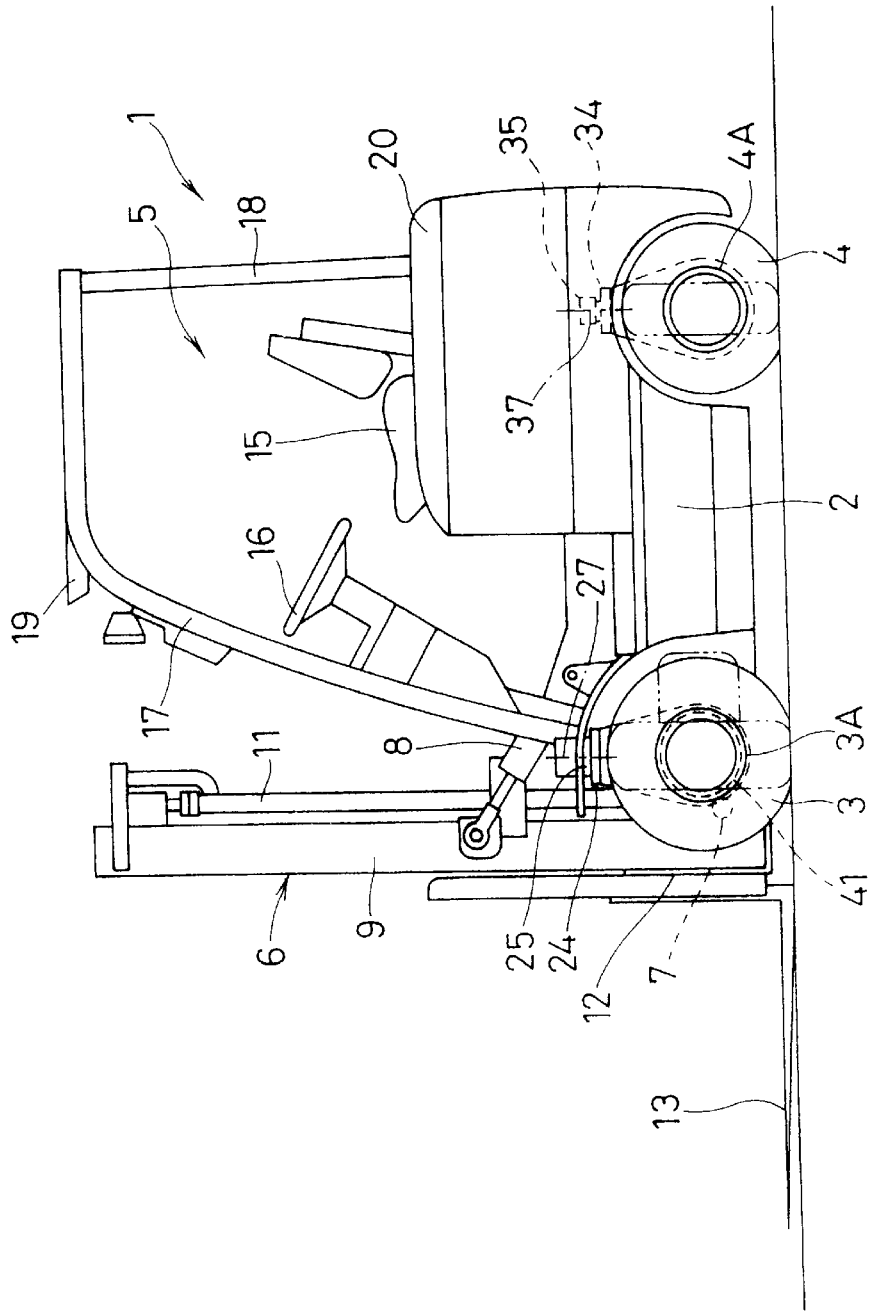
FIG. 5 is a side view of a fork lift with a laterally travelling system during normal running, illustrating a second embodiment of the present invention.
Figure 6:
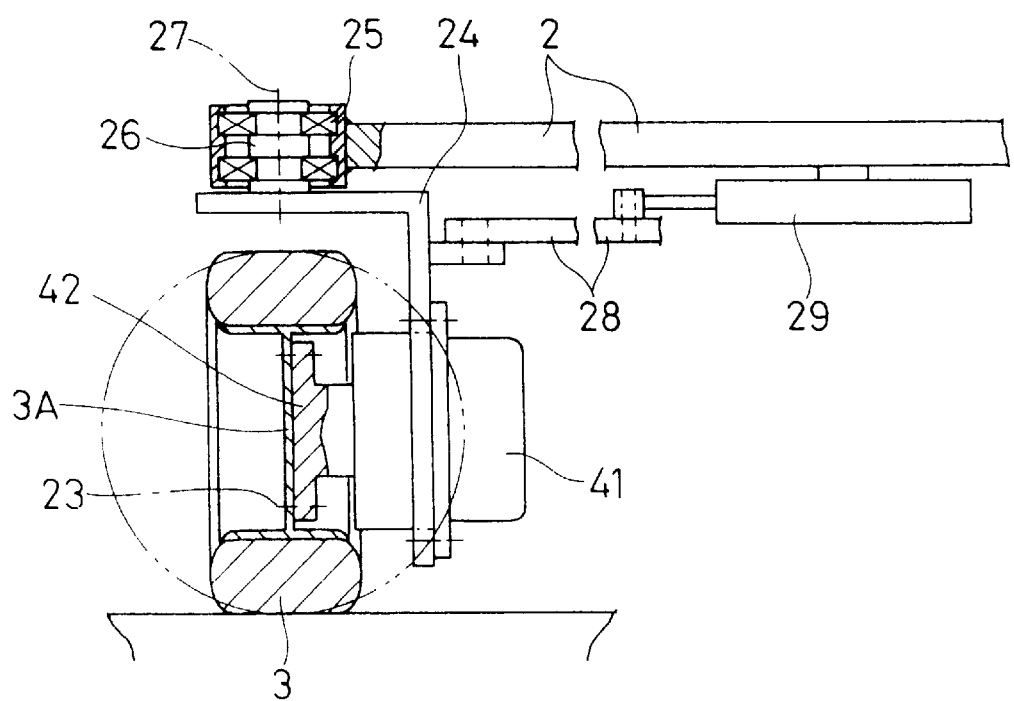
FIG. 6 is a partially cutaway front view of a front wheel section of the fork lift with a laterally travelling system.
Figure 7:
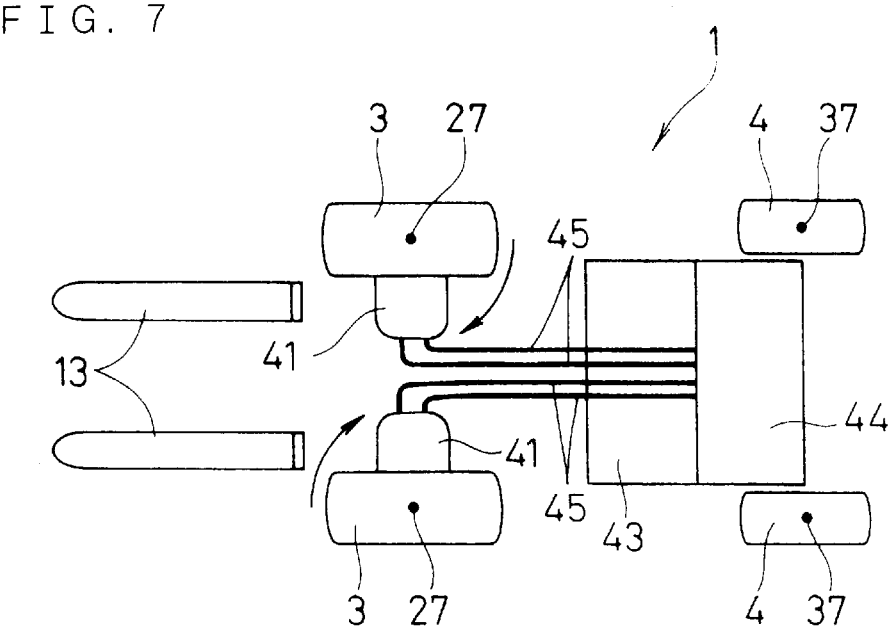
FIG. 7 is a schematic plan view of the fork lift with a laterally travelling system during normal running.

The solid lines in FIG. 5 and FIG. 6 and the diagram in FIG. 7 illustrate a normal running mode, where the right and left-hand front wheels 3 and the right and left-hand rear wheels 4 are facing in the front-and-rear direction. Therefore, by supplying electric power of the battery 43, which has been controlled by the controller 44, to the respective electric motors 41 via the cables 45, the front wheels 3 are driven in forward and reverse directions, whereby the fork lift 1 can travel forwards or rearwards.

Figure 8:
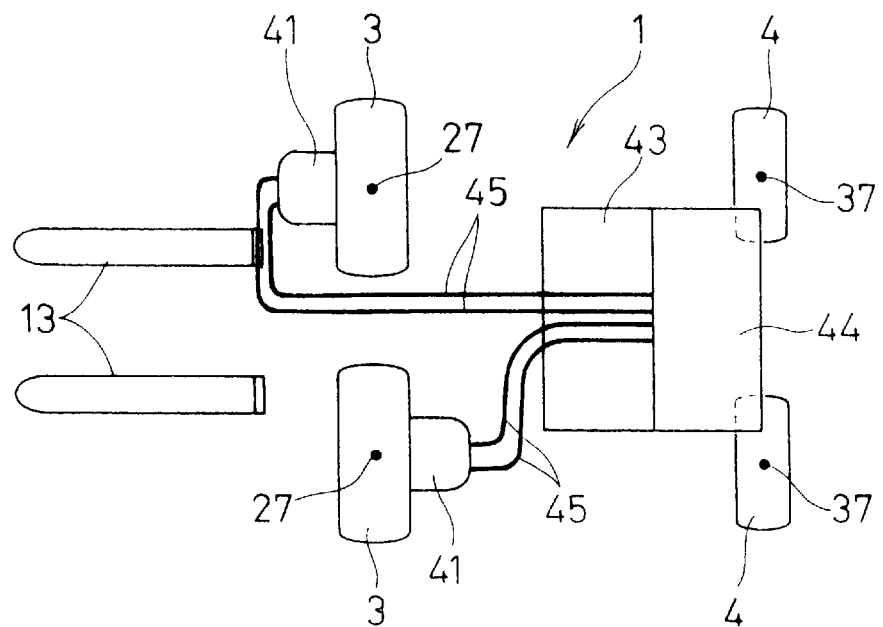
FIG. 8 is a schematic plan view of the fork lift with a laterally travelling system during lateral running.

When switching from this normal running mode to a lateral running mode, as illustrated by the virtual lines in FIG. 5 and FIG. 6 and in the diagram in FIG. 8, the front wheels 3 are steered to a 90° position with respect to the vehicle body 2 (steered to be in a perfectly lateral direction). Since the front wheels 3 are integrally formed with the electric motors 41, respectively, this steering to a 90° position is performed readily and smoothly.

Steering of the front wheels 3 in this manner is detected by a sensor which makes an indicator lamp to light up, whereby the lateral running mode is entered. Therefore, by supplying the electric power of the battery 43, which has been controlled by the controller 44, to the respective electric motors 41 via the cables 45, the front wheels 3 are driven forwards or rearwards, whereby the fork lift 1 can travel laterally in the left or right direction.

Next, a third embodiment of the present invention will be described with reference to FIG. 9 to FIG. 14.

In the third embodiment, constituent elements which are the same or substantially the same as those in the first embodiment described above (FIG. 1 to FIG. 4) are similarly labelled, and further explanation thereof is omitted here.

Rotating means 50 for causing rotation of the turning members 24 is provided, and this rotating means 50 is constituted in such a manner that the turning members 24 are caused to turn in mutually opposing directions by a common actuation device. In other words, vertical pins (one example of a coupling section provided on the turning member) 51 are provided respectively on the lateral plate sections of both rotating members 24 in such a manner that the two vertical pins 51 are positioned in opposite directions with respect to the vertical axis 27, respectively, to the front and to the rear of the vertical axis 27.

A link member 52 is provided in the lateral direction of the vehicle, and either end of this link member 52 is coupled in a relatively rotatable fashion to one of the aforementioned vertical pins 51. A turning cylinder (one example of an actuation device) 53 for causing the link member 52 to move in the lateral direction of the vehicle, is provided between the vehicle body 2 and the link member 52 at the central portion in the longitudinal direction thereof. One example of rotating means 50 is constituted with the elements 51–53 and the like.

The rear wheel 54 is constituted by a parallel pair of right and left-hand wheels, the respective rims 54A of which are attached rotatably to vertical plate sections of a common turning member 55, and the lateral plate section of this turning member 55 is provided rotatably about a vertical axis 58, with respect to the vehicle body 2, by means of a bearing 56 and vertical axle 57. In this, the vertical axis 58 is positioned in the central portion between the two rear wheels 54. This means that the rear wheels 54 are steered in a follow-up steering manner by means of the caster system.

The operation in the third embodiment of the present invention described above will be explained below.

Figure 9:
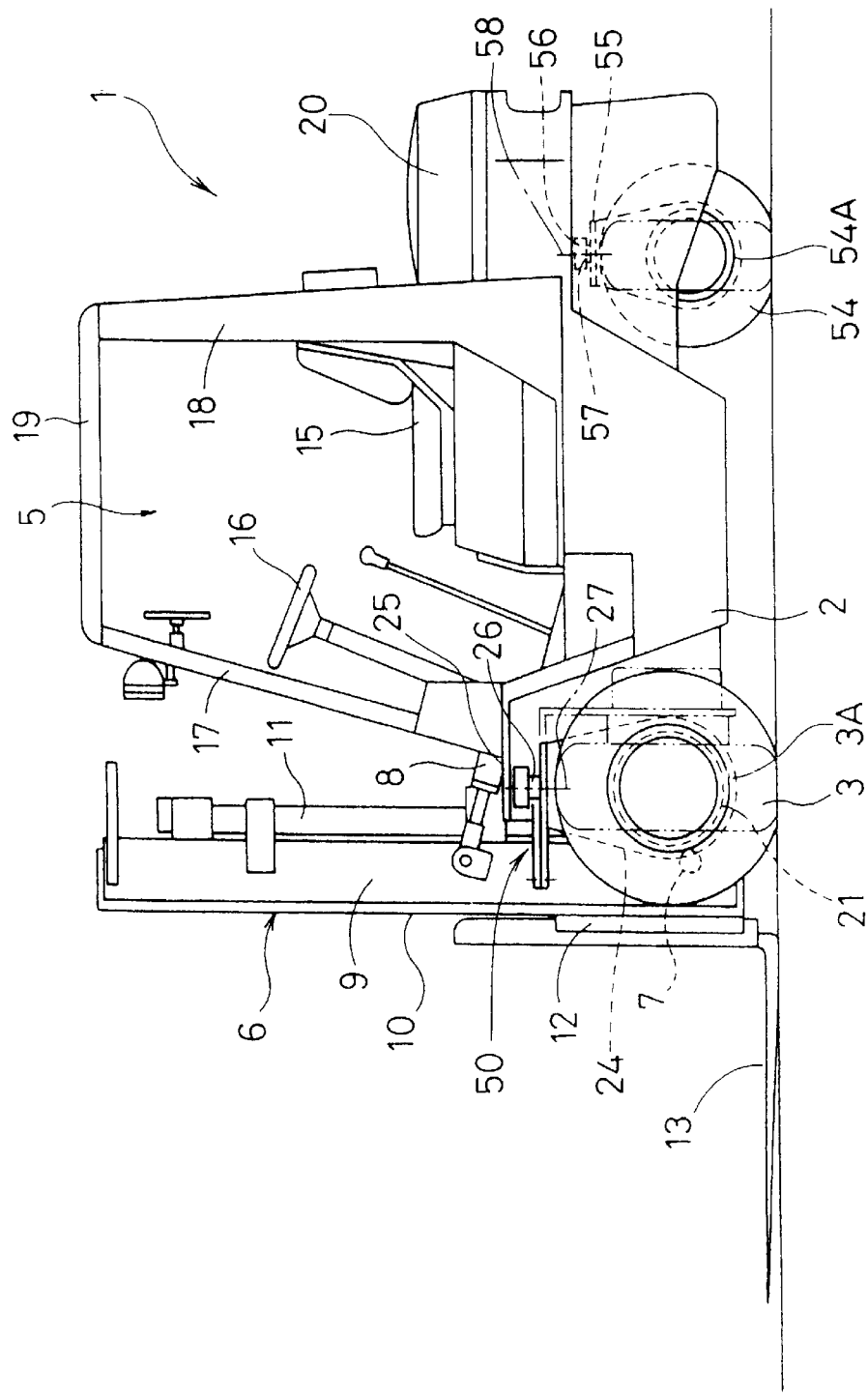
FIG. 9 is a side view of a fork lift with a laterally travelling system during normal running, illustrating a third embodiment of the present invention.
Figure 10:
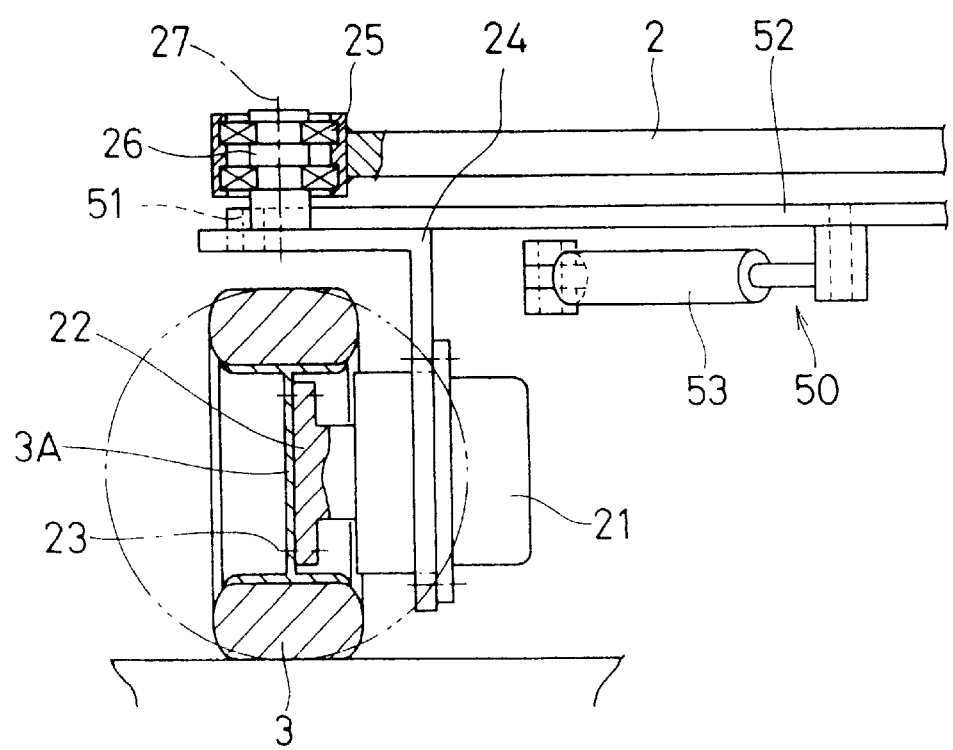
FIG. 10 is a partially cutaway front view of a front wheel section of the fork lift with a laterally travelling system.
Figure 12:
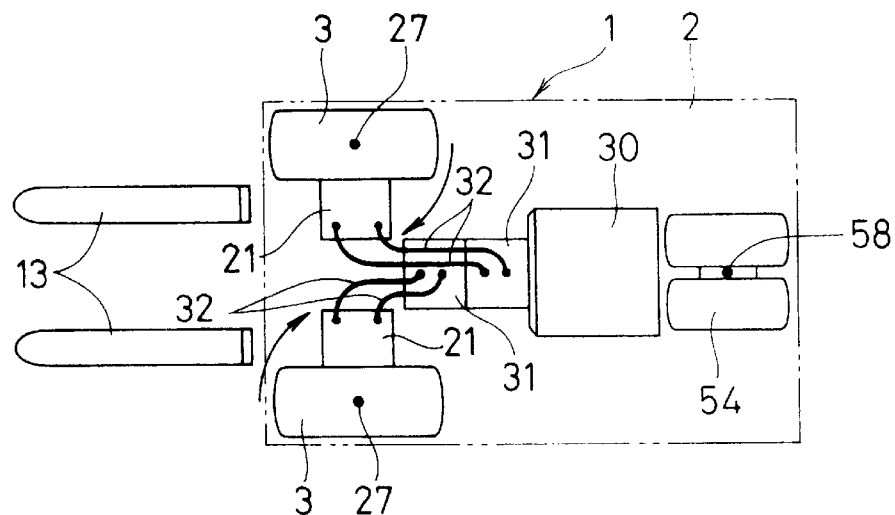
FIG. 12 is a schematic plan view of the fork lift with a laterally travelling system during normal running.

The solid lines in FIG. 9 and FIG. 10, and the diagrams in FIG. 11(a) and FIG. 12 illustrate a normal running mode. By retracting the turning cylinder 53 and causing the link member 52 to move in the direction of retraction, the right and left-hand front wheels 3 and the rear wheels 54 are oriented in the front-and-rear direction.

When switching from normal. running of this kind to lateral running, firstly, a lever-type lateral running mode switch (not shown) is operated, and by inclining a lever, the turning cylinder 53 is caused to extend. Thereby, the link member 52 is moved in the direction of the extension, and in accordance with this movement, the turning members 24 are rotated about the vertical axis 27.

Figure 13:
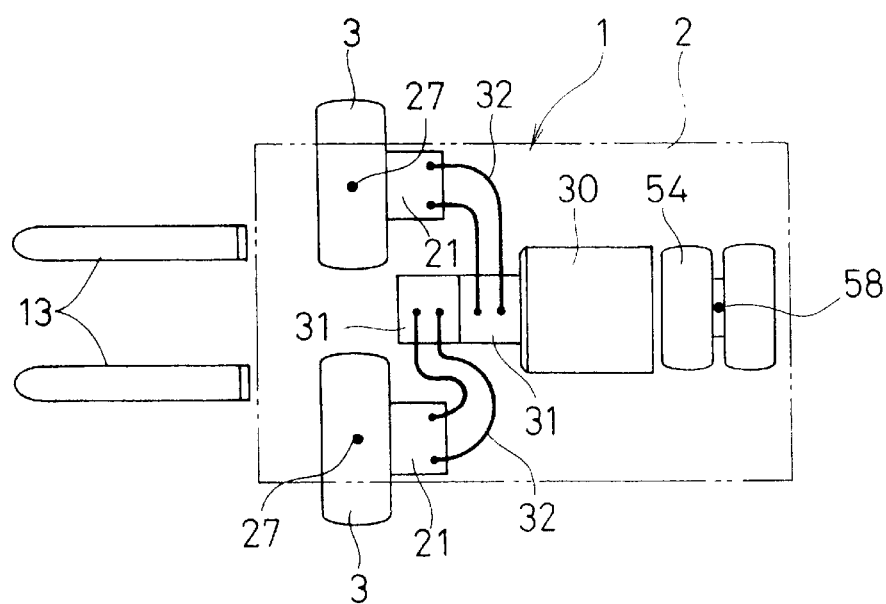
FIG. 13 is a schematic plan view of the fork lift with a laterally travelling system during lateral running.

Since the link member 52 is positioned in a crossing manner with respect to the right and left front wheels 3, as illustrated by the virtual lines in FIGS. 9 and 10 and the diagrams in FIG. 11(b) and FIG. 13, the two turning members 24 rotate in mutually opposite directions about the vertical axis 27, whereupon the two front wheels 3 are steered to a 90° position (in a perfectly lateral direction) with respect to the vehicle body 2.

After steering the front wheels 3 in this fashion, by supplying hydraulic pressure from the pair of pumps 31 driven by the engine 30 to the corresponding hydraulic motors 21 by means of the pipes 32, the front wheels 3 are driven forwards and rearwards, and hence the fork lift 1 is enabled to travel laterally in the right and left direction. In so doing, the hydraulic motors 21 corresponding to the right and left-hand front wheels 3 are controlled in such a manner that they rotate in opposite directions. The right and left-hand pair of rear wheels 54 forming a turning caster system perform follow-up steering.

Figure 14A:
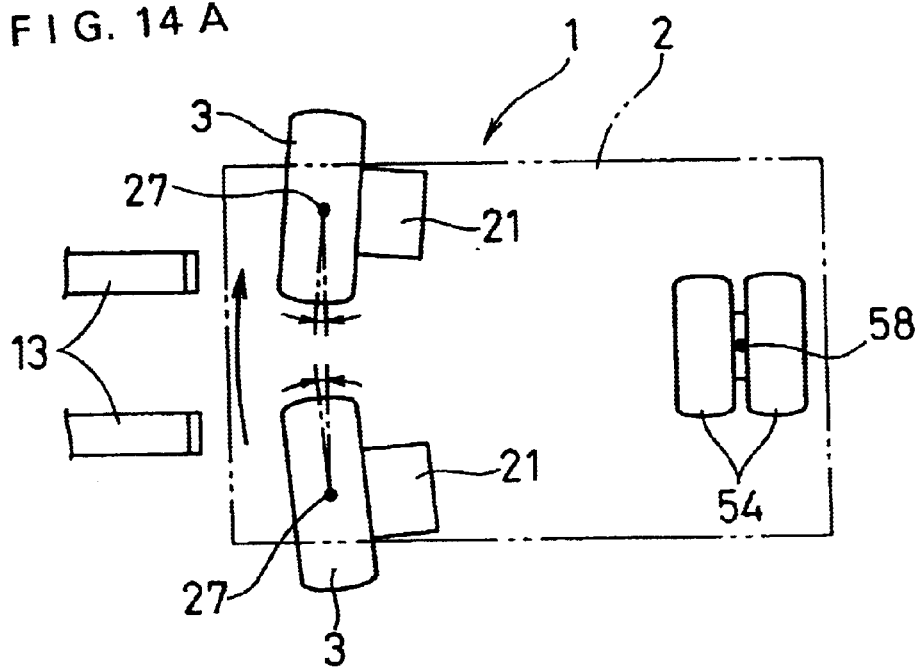
FIG. 14 is a schematic plan view of the fork lift with a laterally travelling system during lateral running adjustment.
Figure 14B:
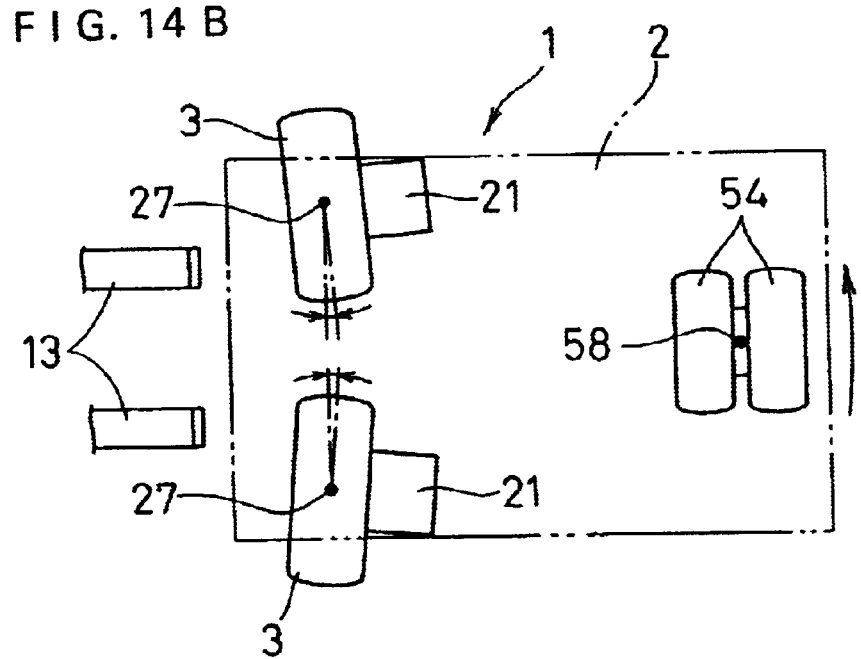

When performing lateral running in this manner, in other words, in a lateral running mode where the front wheels 3 are steered to a 90° position with respect to the vehicle body 2 (in a perfectly lateral direction), the turning cylinder 53 is slightly retracted to steer the front wheels 3 inwards by a small angle (in a range of about 5°) as illustrated in FIG. 14(a), or the turning cylinder 53 is slightly extended to steer the front wheels 3 outwards by a small angle (in a range of about 50) as illustrated in FIG. 14(b), whereby deviation from a straight course caused by road surface conditions or due to weight balance can be readily corrected.

By steering (moving) the front wheels 3 inwards or outwards by a small angle (in a range of about 5°), it also becomes possible to change the direction of the fork lift 1 to some extent during lateral running. Further, if it is structurally permitted, by taking the steering angle of the front wheels 3 to be greater than 5°, it also becomes possible to perform turning during lateral running.

In the third embodiment described above, the rear wheel 54 was described as a parallel pair of right and left-hand wheels, but it is also possible to adopt a pair of right and left-hand rear wheels 54 disposed similarly to the front wheels 3. In this case, one of the pair of right and left-hand rear wheels 54 may be of a steering-type controlled by a handle wheel and the other may be of a turning caster-type, and when switching to lateral running, the former one of the rear wheels 54 is forcibly steered by means of a cylinder or the like.

Next, a fourth embodiment of the present invention will be described with reference to FIG. 15 to FIG. 20.

In this fourth embodiment, constituent elements which are the same or substantially the same as those in the first embodiment described above (FIG. 1–FIG. 4) are similarly labelled, and detailed explanation thereof is omitted here.

The mounts of hydraulic motors 21 are attached in a lateral direction to vertical plate sections of T-shaped turning members 60, and the lateral plate sections of the turning members 60 are installed rotatably about a vertical axis 63 with respect to the vehicle body 2 via a bearing 61 and vertical axle 62. Here, a vertical axis 63 is positioned away from a front wheel ground contact axis 64 located at the central portion of the front wheel 3, with a space equal to a lateral-directional displacement L therebetween.

Rotating means 70 for rotating the turning members 60 is provided, and this rotating means 70 is constituted in such a manner that the two turning members 60 are turned in the same direction by means of a common actuation device. In other words, the rotating means 70 comprises a turning cylinder (one example of a common actuation device) 71, and a main body 71a of this turning cylinder 71 is installed swingably on the vehicle body 2 via a vertical pin 72. A piston rod 71b is coupled in a relatively rotatable fashion to a link 73 fixed to one of the turning members 60 via a vertical coupling pin 74.

Two arms 75 projecting from the right and left-hand vertical axles 62 are mutually coupled in a relatively rotatable fashion by means of a link member 76 and coupling pins 77. The two coupling pins 77 are disposed in the same front-and-rear direction with respect to the vertical axes 63, and consequently, when the right and left-hand front wheels 3 are steered in the front-and-rear direction, the link member 76 is positioned parallel to the front wheel axis between the two front wheels 3.

Therefore, by actuating the turning cylinder 71 to rotate one of the turning members 60 via the link 73, one of the front wheels 3 on one side is steered about the vertical axis 63 and caused to face directly sideways, and the other front wheel 3 is steered about the vertical axis 63 and caused to face directly sideways by means of the arm 75, link member 76 and the like. In other words, with the rotating means 70, by actuating the common turning cylinder 71, the right and left-hand front wheels 3 are rotated (steered) mutually in the same direction to face perfectly sideways respectively. The elements 71 to 77 and the like constitute one example of the rotating means 70.

The operation of the fourth embodiment described above will be explained below.

Figure 15:
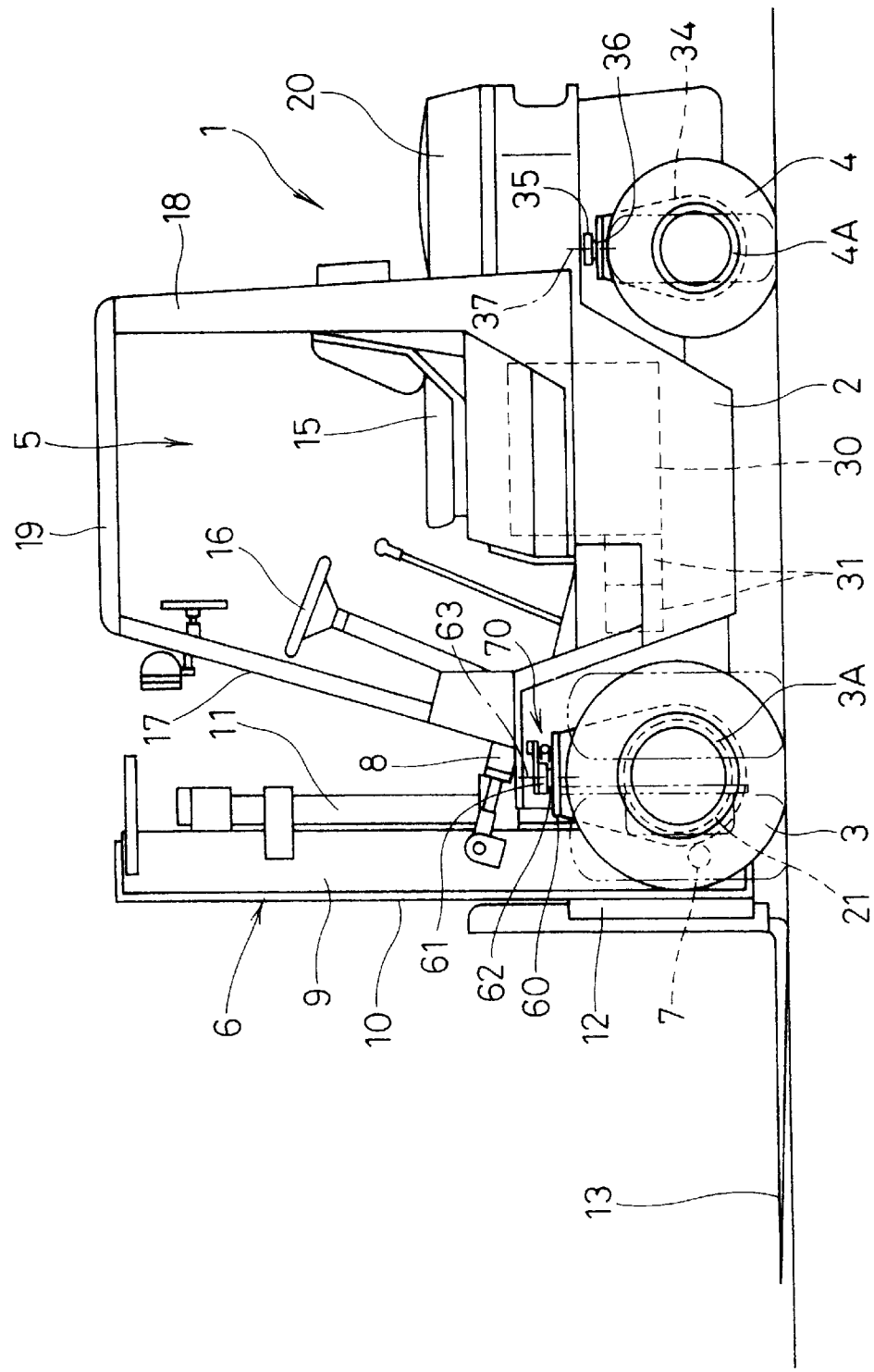
FIG. 15 is a side view of a fork lift with a laterally travelling system during normal running, illustrating a fourth embodiment of the present invention.
Figure 16:
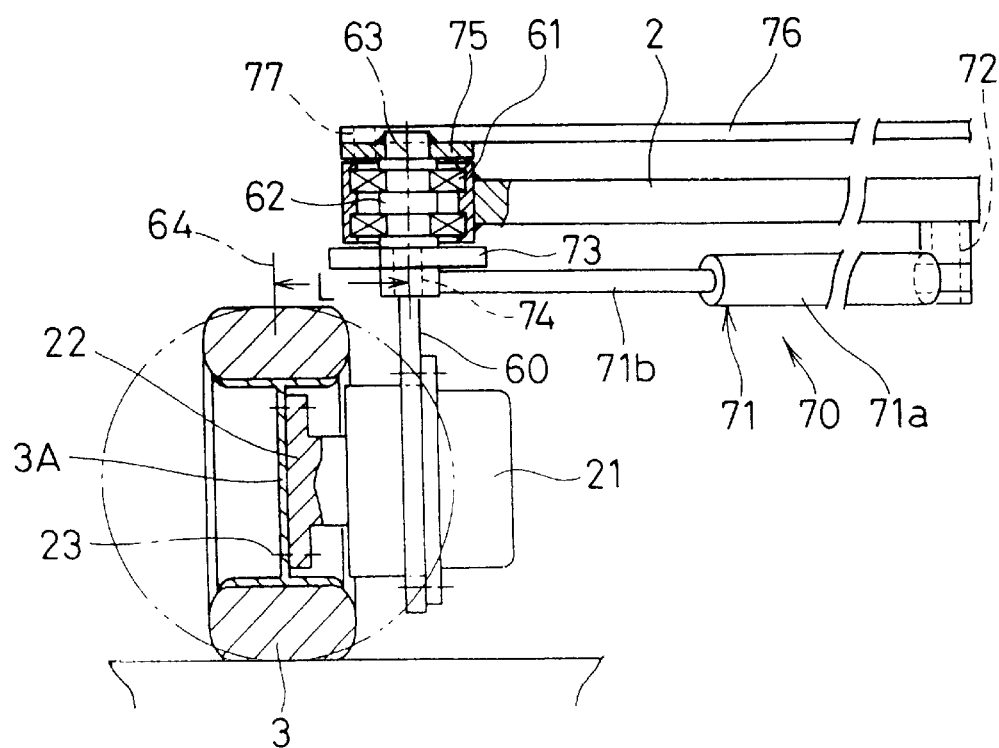
FIG. 16 is a partially cutaway front view of a front wheel section of the fork lift with a laterally travelling system.
Figure 17A:
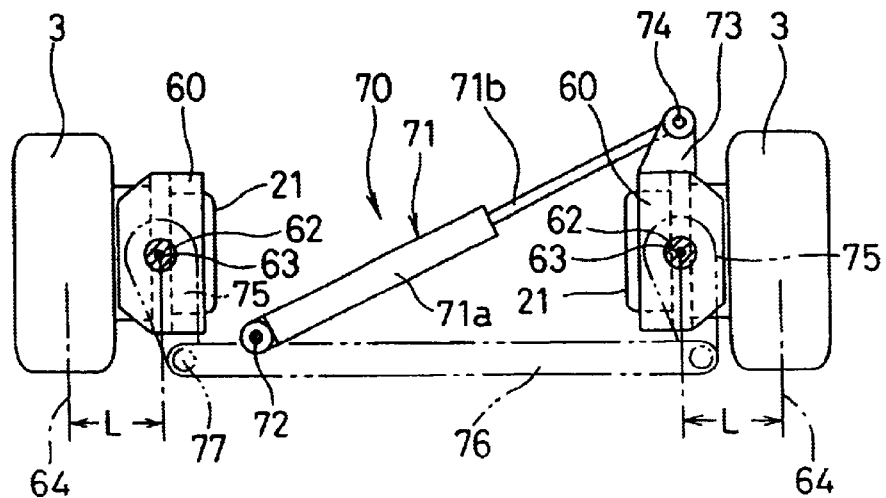
FIG. 17 is a plan view of a front wheel section of the fork lift, (a) during linear running and (b) during lateral running.
Figure 17B:
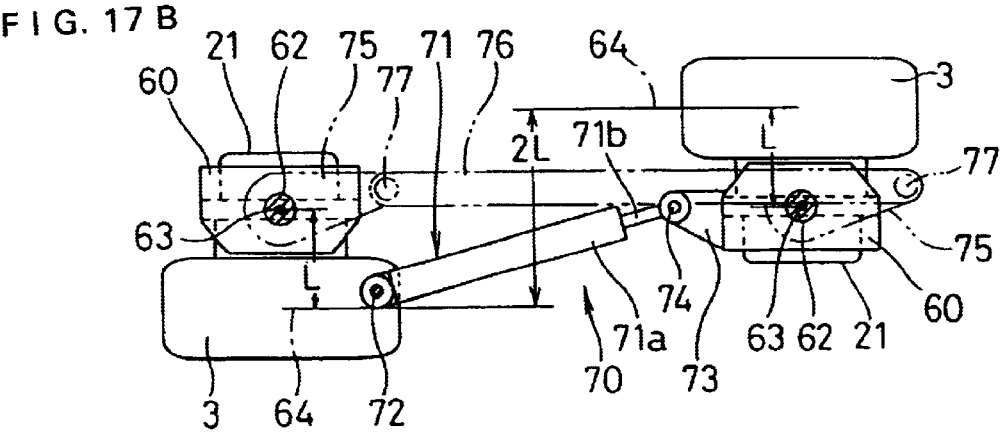
Figure 18A:
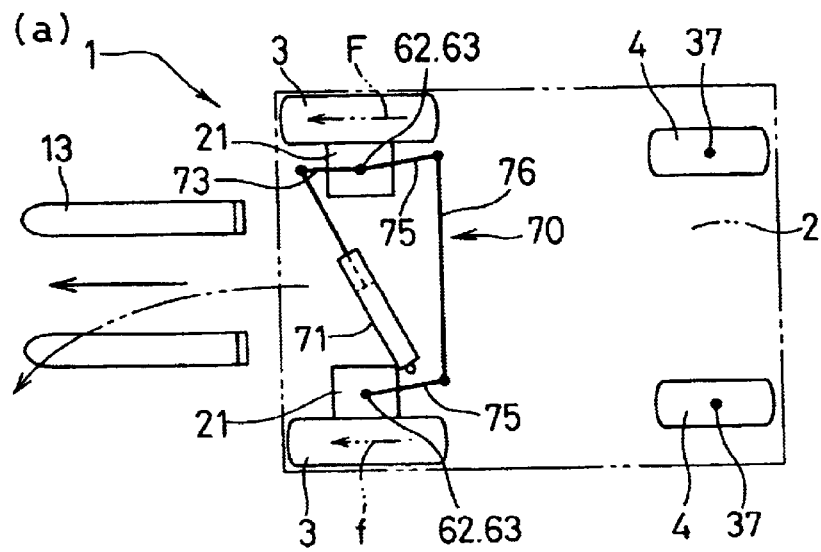
FIG. 18 is a schematic plan view of the fork lift with a laterally travelling system, (a) during linear running and (b) during lateral running.
Figure 18B:
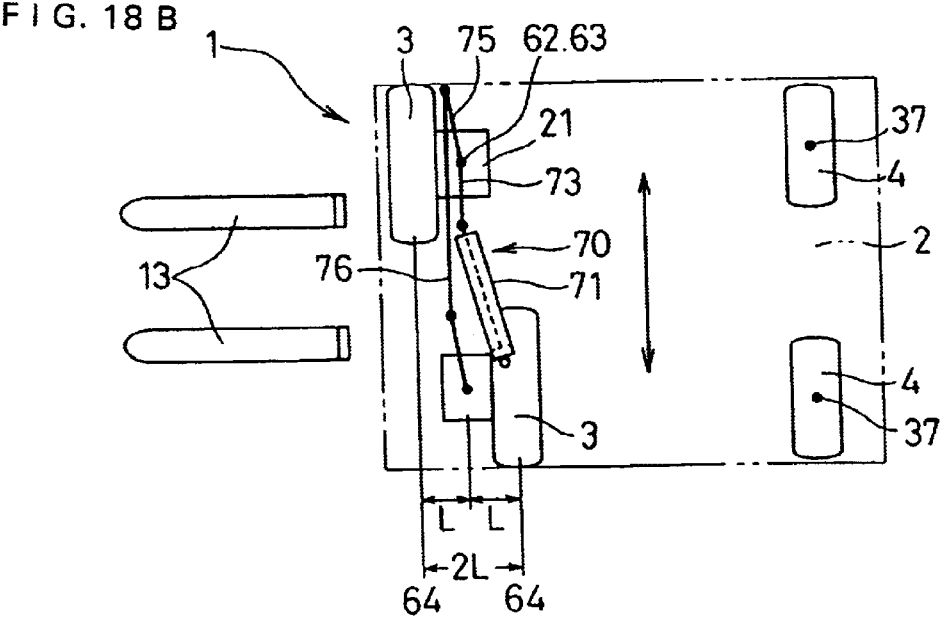
Figure 20A:
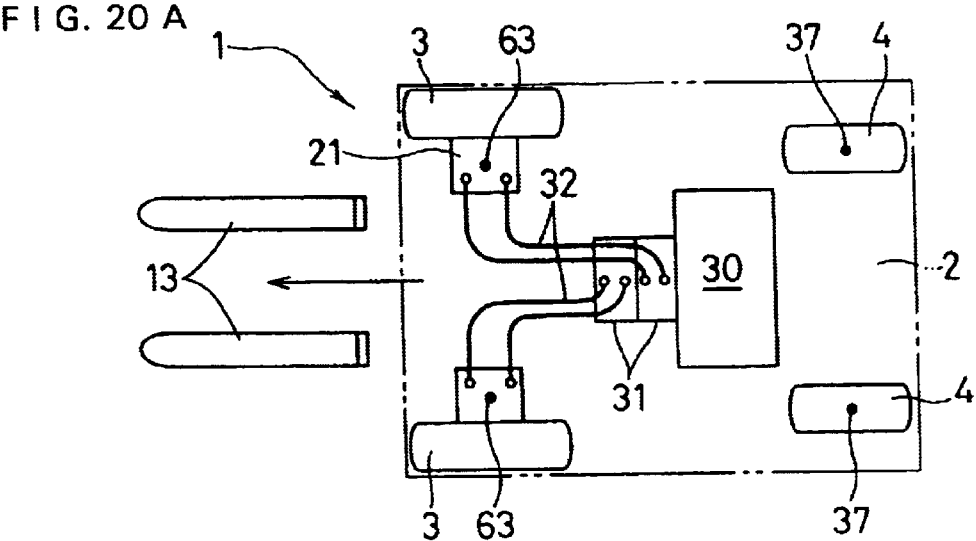
FIG. 20 is a schematic plan view of the fork lift with a laterally travelling system, (a) during linear running and (b) during lateral running.

The solid lines in FIG. 15 and FIG. 16, and the diagrams in FIG. 17, FIG. 18 and FIG. 20(a) illustrate linear movement during normal running, in which the pair of right and left-hand front wheels 3 and the pair of right and left-hand rear wheels 4 are facing in a front-and-rear direction. Here, the rotating means 70 operates such that the turning cylinder 71 is extended, the link 73 is moved in this direction of extension, and the link member 76 is placed in parallel to the front wheel axis, so that the right and left-hand front wheels 3 are oriented in the front-and-rear direction.

As described above, a two-pump two-motor type hydraulic drive system is adopted as a driving system for the fork lift 1, so that turning during linear movement in a normal running mode can be effected by controlling the steering direction of the two front wheels 3 and the difference in revolutions thereof by means of the handle wheel. In other words, as illustrated by virtual lines in FIG. 18(a), for example, when speed of revolutions on the right-hand side, F, is raised higher than the speed of revolutions on the left-hand side, f, the fork lift 1 will perform a left-hand turn due to the resulting difference in revolutions. In this case, the right and left pair of rear wheels 4 will perform a follow-up turning while automatically changing the orientation thereof to the direction of the steering. A right-hand turn can be performed in a similar manner by increasing the speed of revolutions on the left-hand side to be higher than that on the right-hand side.

When switching from normal running of this kind to lateral running, a lever-type lateral running mode switch (not shown), for example, is operated first, and then the rotating means 70 is actuated. More specifically, in the rotating means 70, the turning cylinder 71 is caused to retract by inclining the lever. Thereby, one of the turning members 60 is rotated about the vertical axis 63 via the link 73 and the like, whilst the other turning member 60 is rotated about the vertical axis 63 by means of the vertical axle 62, arm 75, link member 76 and the like.

Figure 20B:
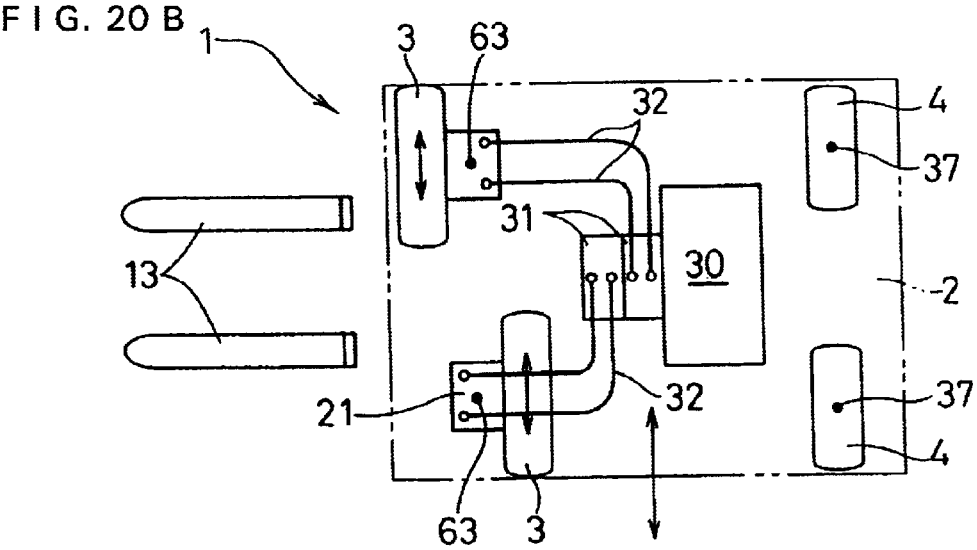

Since the link member 76 is positioned in parallel to the front wheel axis, the two turning members 60, as illustrated by the virtual lines in FIG. 15 and FIG. 16, and the diagrams in FIG. 17, FIG. 18 and FIG. 20(b), are rotated in the same direction about their vertical axes 63, and the two front wheels 3 are steered to a 90° position (in a perfectly lateral direction) with respect to the vehicle body 2. Moreover, since the vertical axes 63 are distanced from the respective front wheel ground contact axes 64 by a space equal to the lateral-directional displacement L, the two front wheels 3 which have been steered to a 90° position (in a perfectly lateral direction) to be directed laterally are distanced from each other in the front-and-rear direction by a displacement in lateral movement, 2L, that is double the displacement L.

By steering the front wheels 3 to a 90° position in this way, the lateral running mode can be assumed. Consequently, by supplying the hydraulic pressure from the pair of hydraulic pumps 31 to the corresponding hydraulic motors 21, the front wheels 3 are driven in forward and reverse directions, and the fork lift 1 can perform lateral running in the right-and-left direction, as illustrated in FIG. 18 and FIG. 20(b). Here, during lateral running in a linear direction, the hydraulic motors 21 corresponding to the right and left-hand front wheels 3 are controlled in such a manner that the respective directions of rotation and revolutions are the same.

When lateral running is performed in this way, in other words, when the lateral running mode in which the two rear wheels 4 are steered 90° (in a perfectly lateral direction) with respect to the vehicle body 2 is taken as a neutral state, and a steered angle of the handle 16 or rear wheels 4 from this state is detected by a sensor or the like, and by changing the input and output to and from the hydraulic controller, different speeds of revolutions are given to the right and left-hand front wheels 3 respectively, thereby to effect turning.

Figure 19A:
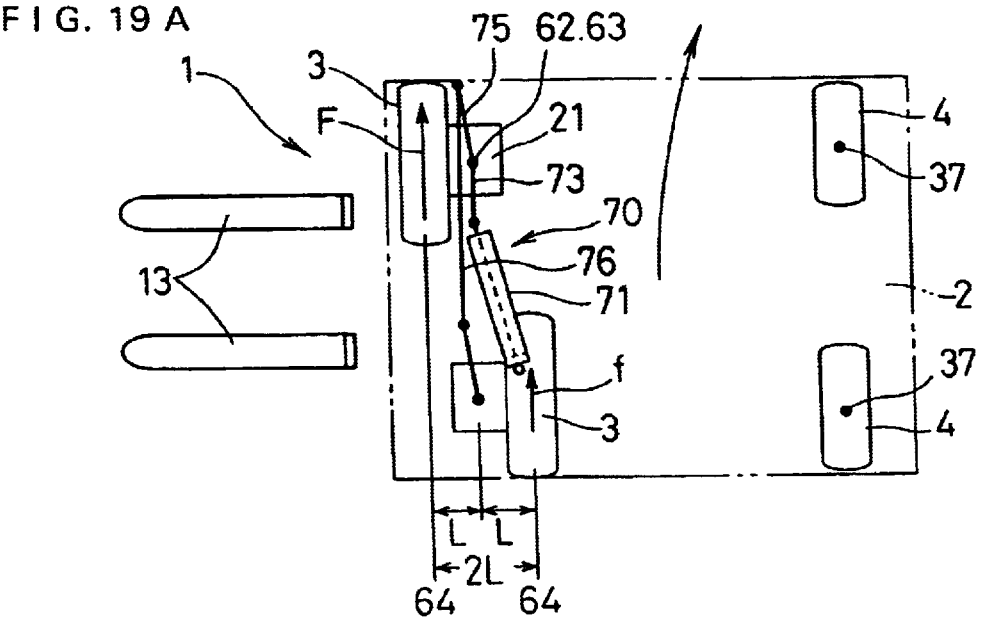
FIG. 19 is a schematic plan view of the fork lift with a laterally travelling system, (a) during steering of the rear section and (b) during steering of the front section.
Figure 19B:
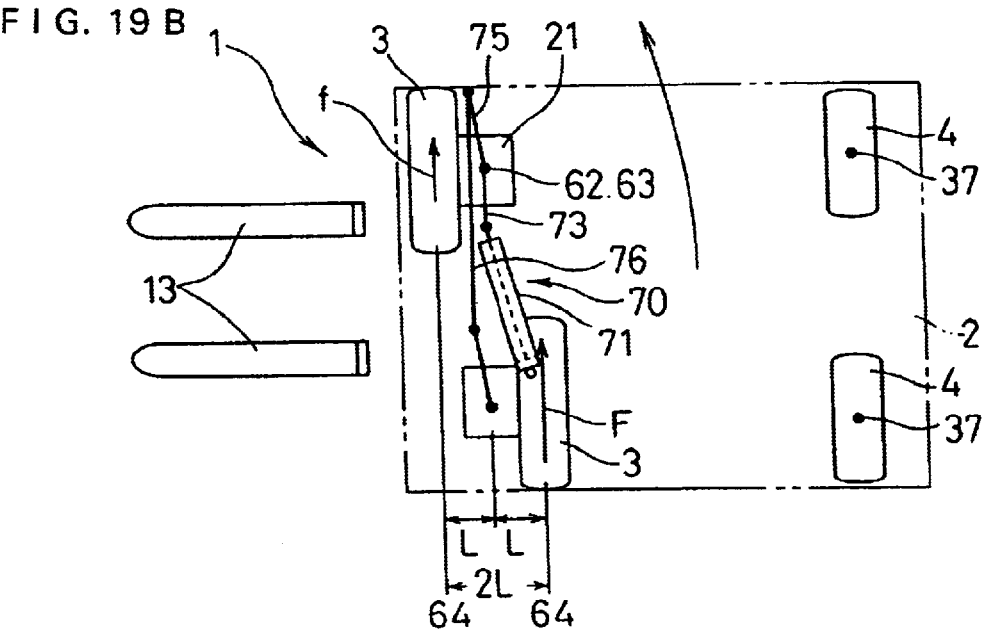

In other words, in lateral running to the right-hand side as illustrated in FIG. 19(a), if the right-hand side front wheel 3 is set to a high speed of revolutions F and the left-hand side front wheel 3 is set to a low speed of revolutions f, a right-hand turning force acts on the vehicle body 2 due to the difference in speed of revolutions between the front wheels 3 which are distanced by the lateral running displacement of 2L, and lateral running to the right is performed while turning towards the rear side. Moreover, in lateral running to the right-hand side as illustrated in FIG. 19(b), if the left-hand side front wheel 3 is set to a high speed of revolutions F and the right-hand side front wheel 3 is set to a low speed of revolutions f, a left-hand turning force acts on the vehicle body 2 due to the difference in revolutions between the two front wheels 3 distanced by the lateral running displacement 2L, and lateral running to the right-hand side is performed while steering towards the front side.

In lateral running of this kind, since a lateral running displacement 2L arises between the two front wheels 3, a turning force to the left or right can be applied to the vehicle body 2, simply by applying different speeds of revolution to the right and left wheels of the front wheels 3 by way of operating the handle or the like, and hence lateral running can be performed whilst turning the vehicle in the longitudinal direction (front-and-rear direction) thereof. Further, it is possible to readily correct deviation from the straight course caused by the road surface conditions or the weight balance. Similar control can be also achieved during lateral running to the left-hand side.

In the fourth embodiment described above, a system was illustrated in which the turning cylinder 71 is used as an actuation device of the rotating means 70, this may also comprise a system where the steering to a 90° position is performed by means of a motor or the like. Moreover, the rotating means 70 was described as such that the turning cylinder 71 is used as a common actuation device for the right and left-hand wheels, but it is also possible to provide separate actuation devices on the right and left-hand sides.

Next, a fifth embodiment of the present invention is described with reference to FIG. 21 and FIG. 22.

In this fifth embodiment, constituent elements which are the same or substantially the same as those in the first embodiment described above (FIG. 1–FIG. 4) are similarly labelled, and detailed explanation thereof is omitted here.

The pair of right and left-hand front wheels 3 and the pair of right and left-hand rear wheels 4 are provided respectively to be steerable 90° (laterally steerable) with respect to the vehicle body 2. The front wheels 3 are drive wheels, and each comprises an actuation device for performing a 90° steering. The mast 6 disposed at the front end of the vehicle body 2 is disposed such that the lower portions thereof are positioned between the right and left-hand front wheels 3 when in an upright attitude. The mast 6 is attached rotatably in the front-and-rear direction with respect to the vehicle body 2 by means of a coupling axle 80 which is positioned in the lateral direction of the vehicle and above the front wheels 3.

A tilt cylinder 81, which is an example of a rotational drive device for performing front-and-rear rotation of the mast 6, is provided between the mast 6 and the vehicle body 2. When the mast 6 is rotated by the tilt cylinder 81, the lower portions of the mast 6 swings out forwards and moves to a position where the mast does not interfere with the steering of the front wheels 3.

The operation of the fifth embodiment of the present invention described above will be explained below.

Figure 21:
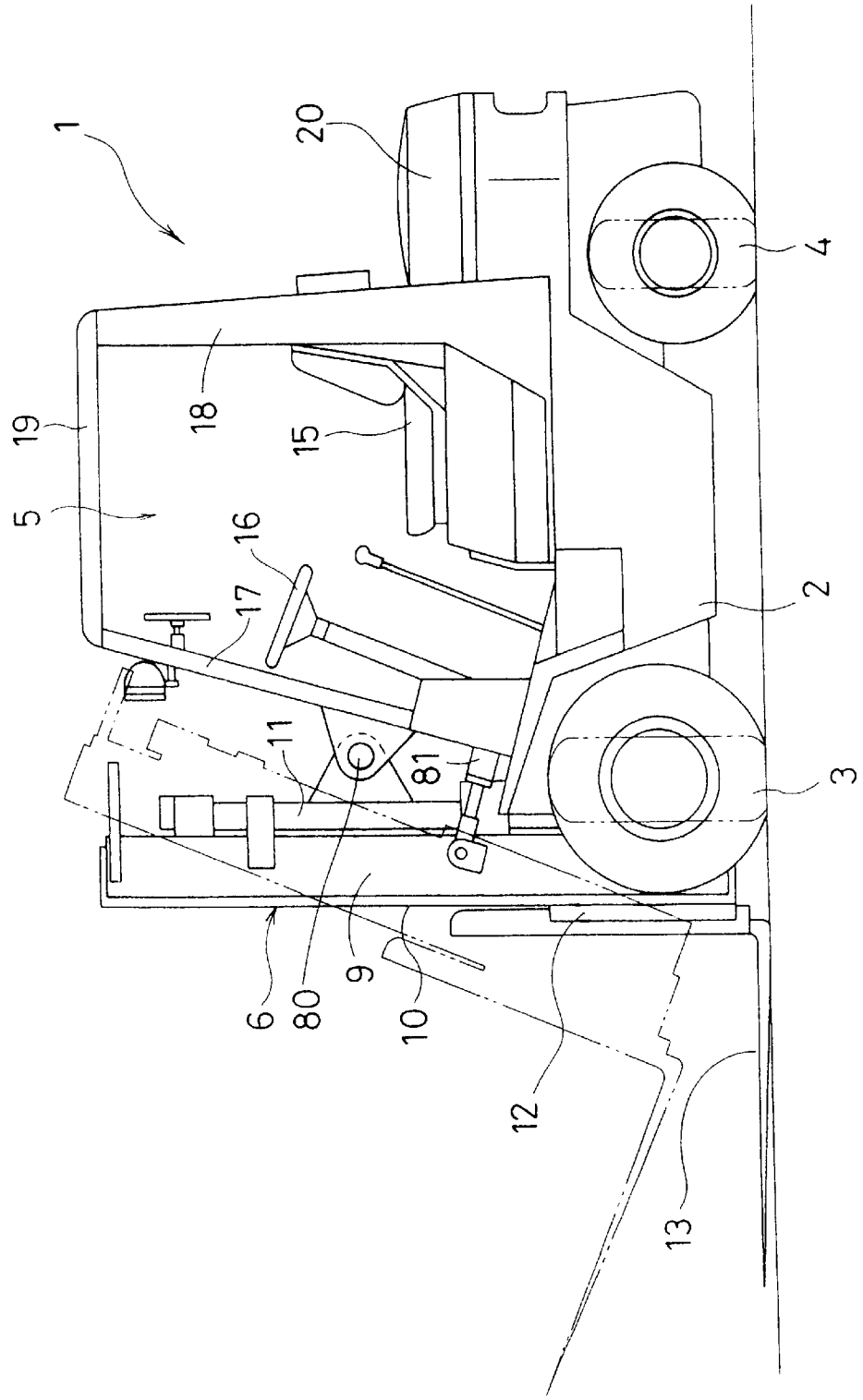
FIG. 21. is a side view of a fork lift with a laterally travelling system during normal running, illustrating a fifth embodiment of the present invention.
Figure 22:
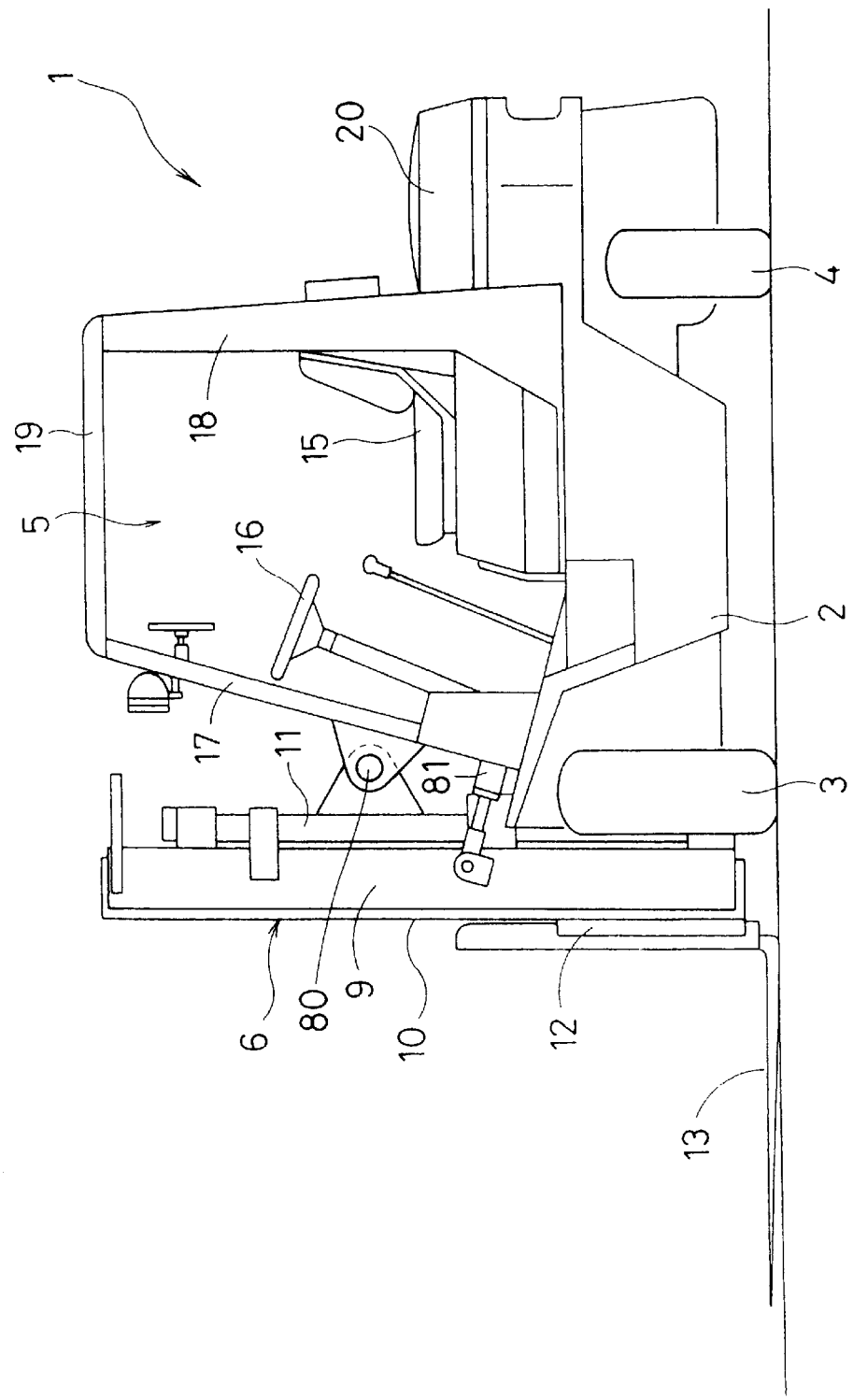
FIG. 22 is a side view of the fork lift with a laterally travelling system during lateral running.

The solid lines in FIG. 21 show a normal running mode. Here, the tilt cylinder 81 is retracted so that the mast 6 is in a standing position and the lower portion thereof is positioned between the right and left-hand front wheels 3. Therefore, the fork lift 1 can be formed without creating a long front overhang. By operating the tilt lever and actuating the tile cylinder 81, the mast 6 can be rotated (tilted) about the coupling axle 80, and hence the attitude of the forks 13 in the fork lift 1 can be changed via the lift brackets 12 and the like.

When switching from normal running of this kind to lateral running, a lateral running mode switch (not shown) is operated first, and the tilt cylinder 81 is extended greatly. By extending the tilt cylinder 81, the mast 6 is rotated (tilted) about the coupling axle 80, and as illustrated by the dotted lines in FIG. 21, the lower section of the mast 6 swings out forwards from between the front wheels 3, and moves to a position where the mast does not interfere with the steering of the front wheels 3.

Next, the turning lever (not shown) is operated, and the front wheels 3 are steered to a 90° position (steered perfectly laterally) with respect to the vehicle body 2, by a 90°-steering-operation device, as illustrated by the virtual lines in FIG. 1. In this, the 90° steering of the front wheels 3 is performed smoothly without any hindrance because the lower section of the mast 6 has been moved to the position where the mast does not interfere with the steering.

After performing the steering of this kind, the tilt cylinder 81 is actuated to retract itself by the feedback from the sensor. Thereby, the mast 6 is rotated about the coupling axle 80 to assume a standing position, as illustrated in FIG. 22, and the lower section of the mast 6 is made to oppose the side faces of the front wheels 3 from the forward direction, so that the fork lift 1 can perform lateral running, without the front overhand becoming long.

In the fifth embodiment described above, the tilt cylinder 81 was described as a rotation drive device, but this may be a screw drive, a linkage system or the like.

In the respective embodiments described above, the turning caster system which performs follow-up steering was adopted as the pair of right and left-hand rear wheels 4, or for the parallel pair of right and left-hand rear wheels 54, but similarly to the front wheels 3, such system as to effect turning forcibly by means of a cylinder or the like may be adopted. Moreover, it is also possible to adopt a steering-type wheel operated by the handle wheel as one of the rear wheels 4, and a turning caster-type wheel as the other rear wheel 4. In this case, when switching to lateral running, the former rear wheel 4 is forcibly steered by a cylinder or the like.

What is claimed is:

1. A fork lift with a laterally traveling system including a pair of right and left-hand front wheels and a pair of right and left-hand rear wheels each provided on a vehicle body, characterized in that:

the front wheels and the rear wheels are respectively provided to be steerable;

the pair of right and left-hand front wheels are respectively coupled in linkage to driving shafts of travel drive devices;

each of said travel drive devices is attached to turning members provided to be rotatable about a vertical axis with respect to the vehicle body, and rotating means is provided for rotating the turning members;

said rotating means comprising coupling sections of the turning members disposed in mutually opposing directions in a front-and-rear direction with respect to the vertical axis, a link member in a lateral direction of the vehicle, the link member being coupled between these coupling sections to enable the turning members to be relatively rotatable, and an actuation device for moving this link member in the lateral direction of the vehicle; and a mast is provided on the front end of the vehicle body, and forks are provided on the mast.

* * * * *